June 17, 1969     H. E. SMITH     3,450,210
PLANTER MARKER LATCH AND ALTERNATING MEANS
Filed Feb. 20, 1967     Sheet 1 of 4
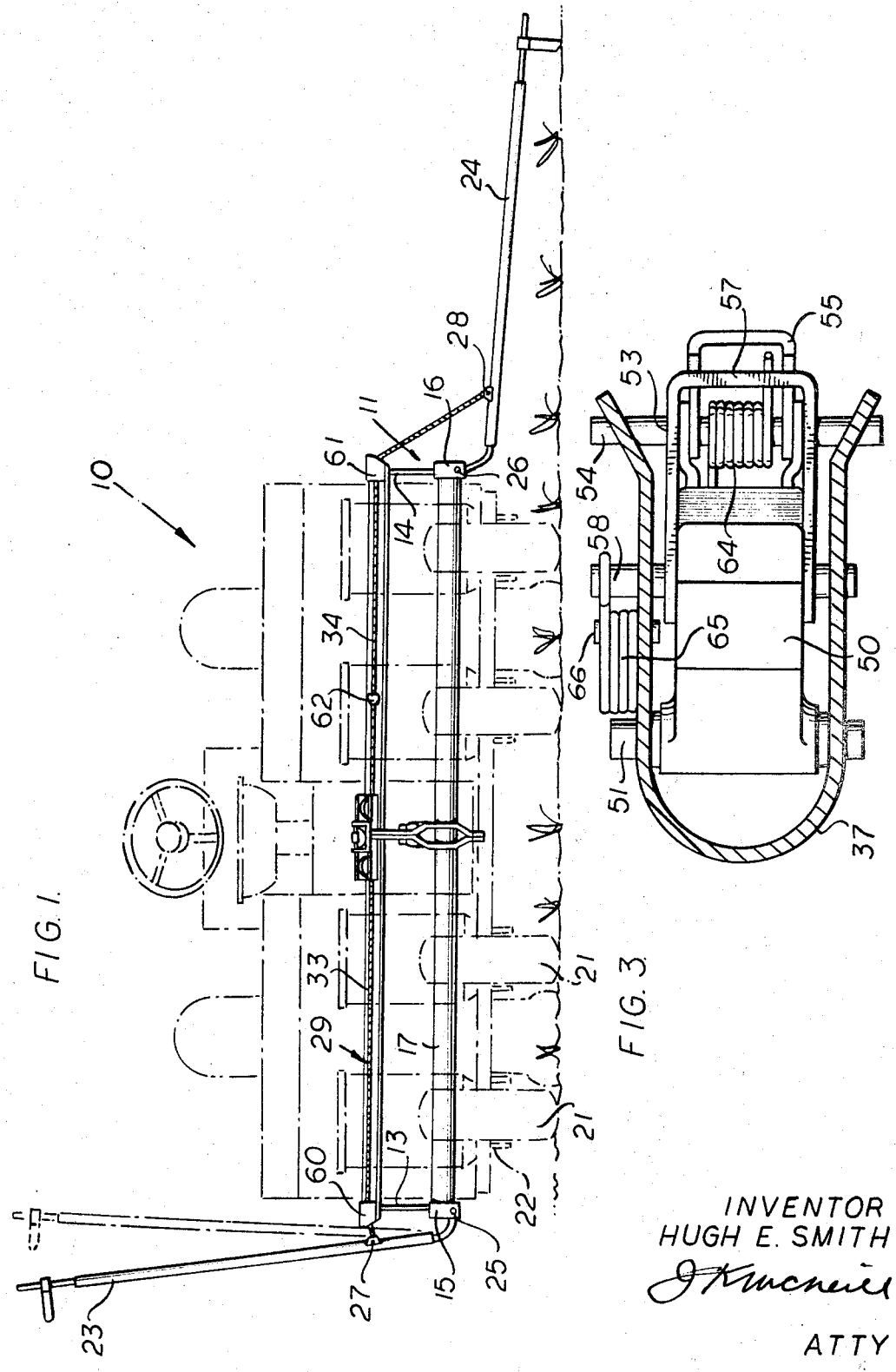
INVENTOR
HUGH E. SMITH
ATTY

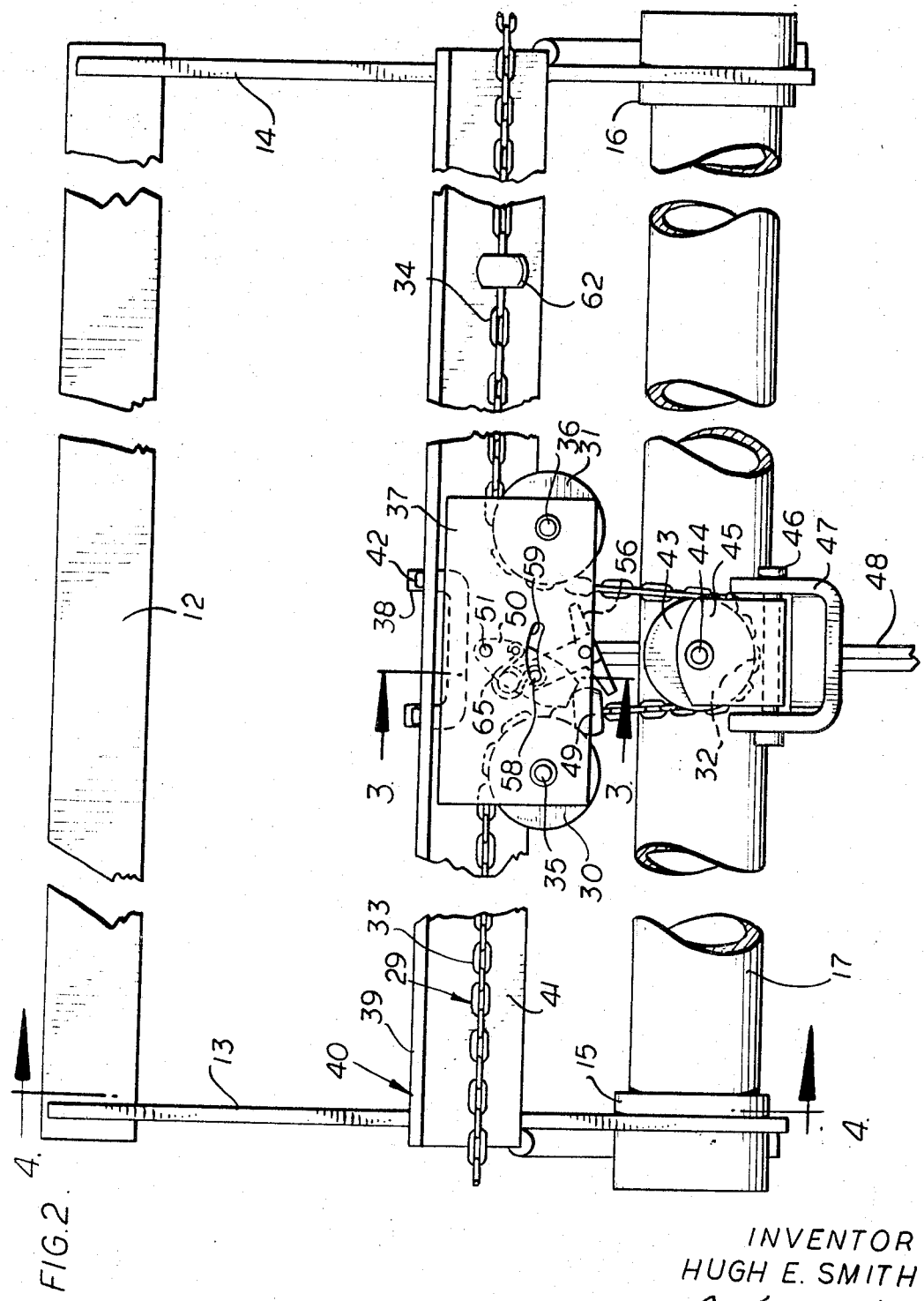

INVENTOR
HUGH E. SMITH

ATTY

United States Patent Office 3,450,210
Patented June 17, 1969

3,450,210
PLANTER MARKER LATCH AND
ALTERNATING MEANS
Hugh Edward Smith, Downers Grove, Ill., assignor to
International Harvester Company, Chicago, Ill., a corporation of Delaware
Filed Feb. 20, 1967, Ser. No. 617,340
Int. Cl. A01b 35/32, 33/16, 29/06
U.S. Cl. 172—130                                          7 Claims

ABSTRACT OF THE DISCLOSURE

A pair of markers mounted at the ends of an implement are alternately raised and lowered when raising and lowering the frame, by a chain connecting the markers having a central portion passing over spaced pulleys and reciprocated by the hydraulic-lifting cylinder. Automatic alternation is achieved by an overcenter trip arrangement between the pulleys including an actuator alternately engaged by balls affixed to the chain sections leading to the markers and a latch swingable from one position to another to engage one of the balls and hold one marker in raised position.

This invention relates to markers for implements such as planters, and particularly to apparatus for alternately raising and lowering left- and right-hand markers.

In the operation of planter markers it is customary when the implement is to be turned as at the end of a field, to reverse its direction of operation to raise the ground working units and to manually raise the previously operating marker before the turn is made. After the turn is made the other marker is then lowered. Since the operator of the tractor is usually occupied with steering the tractor and lifting the implement, the handling of the marker is erratic and it has been proposed to incorporate the marker operation with the raising and lowering of the implement. However, the devices developed for this purpose have been complicated, expensive and inefficient, and an object of the present invention is the provision of novel mechanism for alternately raising and lowering planter markers in response to the raising and lowering of the implement.

Another object of the invention is the provision, in apparatus for raising and lowering left- and right-hand planter markers and the like, novel latch means for automatically locking the non-operating marker in raised position while releasing the alternate marker so that it can be lowered to operating position.

Another object of the invention is the provision, in apparatus for alternately raising and lowering implement markers and the like interconnected by flexible cable means, of novel overcenter latch means centrally located between the marker arms, wherein a pair of stops or latch engaging members are affixed to the cable means and alternately engageable with the latch means when the operating member is lifted, to trip the latch means from one overcenter position to another into locking relation with the associated stop member.

Further objects and advantages of the invention will become clear from the following detailed description when read in conjunction with the accompanying drawings wherein:

FIGURE 1 is a diagrammatic rear elevation of a tractor to which is connected a planter having marker alternator and latch mechanism thereon incorporating the features of this invention;

FIGURE 2 is a plan view on an enlarged scale, with parts broken away, of a portion of the structure shown in FIGURE 1;

FIGURE 3 is an enlarged section taken on the line 3—3 of FIGURE 2;

Figure 4:
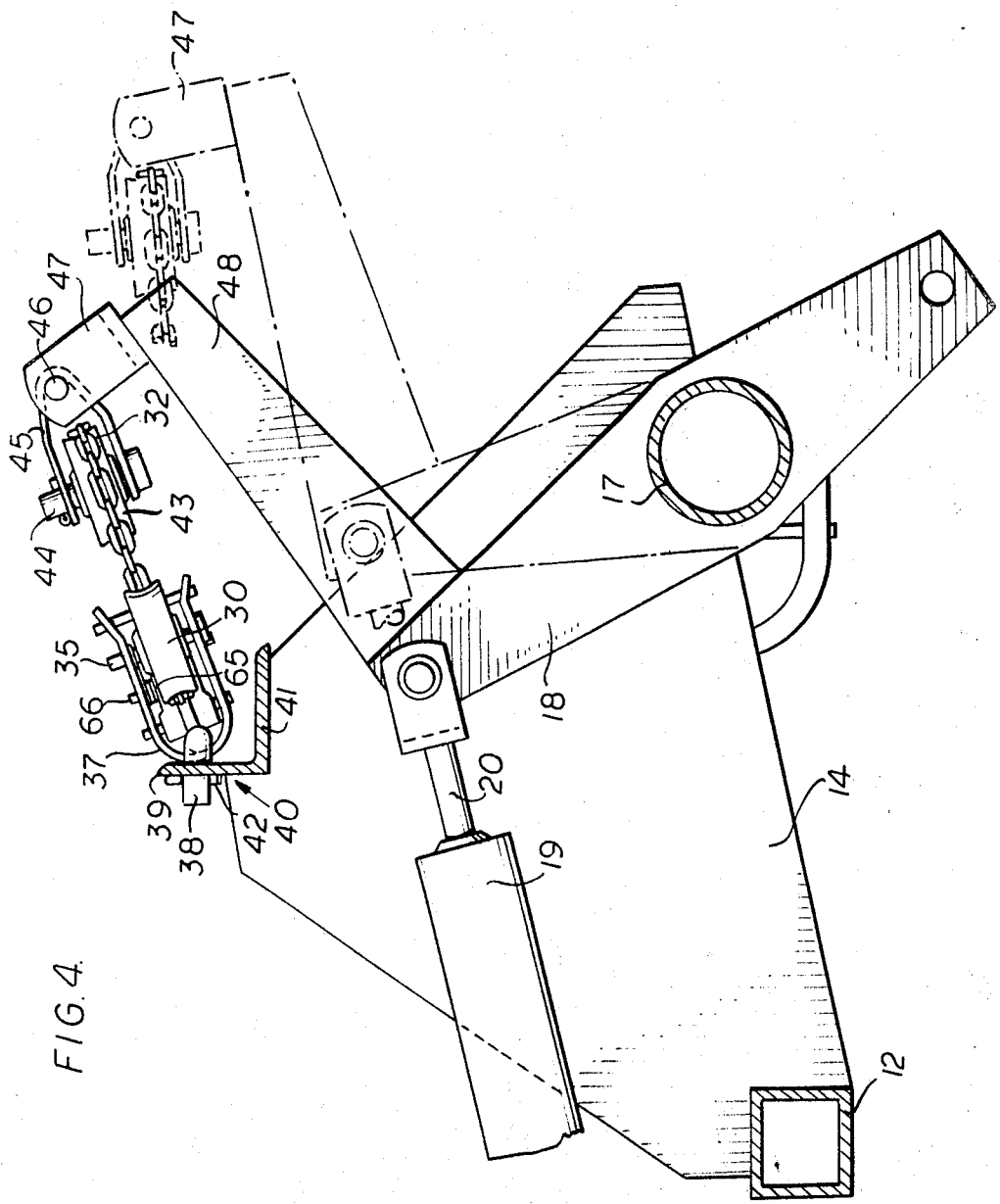
FIGURE 4 is a section taken on the line 4—4 of FIGURE 2.

In the drawings FIGURE 1 shows a conventional tractor 10 to which is connected a four-row planter, the constructional details of which form no part of this invention, but which may be understood to include a framework 11 comprising a transversely extending structural member 12, square in cross-section, to the ends of which are secured generally triangularly shaped plates 13 and 14 on which are mounted left- and right-hand bearings 15 and 16 rotatably supporting the ends of a transverse rockshaft 17, cylindrical in section, to the central portion of which is secured an arm 18. A hydraulic cylinder 19 anchored in any suitable manner to the implement frame and supplied with fluid under pressure in well-known manner from the tractor 10, has a piston rod 20 slideable therein and pivotally connected to arm 18.

For the purposes of this invention it may be considered that frame 11 is supported upon four wheels 21, which are mounted on shaft 17 by arms 22 so that upon operation of cylinder 19 shaft 17 can be rocked to vertically swing the wheels for raising and lowering the frame.

Left- and right-hand marker arms 23 and 24 are pivotally mounted on bearing housings 15 and 16 by pivot pins 25 and 26, respectively. Lugs 27 and 28 are affixed to markers 23 and 24 and serve to anchor the ends of a transversely extending flexible cable in the form of a chain 29 the central portion of which is trained over a pair of laterally spaced pulleys 30 and 31 forming a central or bight portion 32 extending at right angles rearwardly and forming left- and right-hand chain sections 33 and 34 leading to the respective markers 23 and 24.

Pulleys 30 and 31 are rotatably mounted on spindles 35 and 36 mounted between the arms of a U-shaped housing 37 having nubs 38 received in openings provided in the vertical flange 39 of a transversely extending angle bar 40 having a horizontal portion 41 and secured at its ends to plates 13 and 14. Housing 37 is retained against displacement from flange 39 by the provision of cotter keys 42 in nubs 38.

Central portion 32 of the chain is trained over a pulley 43 mounted on a spindle 44 carried by a clevis 45 which, in turn, is mounted upon a pin 46 carried by a U-shaped member 47 affixed to a part 48 forming an extension of rockarm 18.

In FIGURE 1 the left-hand marker is shown in its raised position while the right-hand marker is in a generally horizontal position for operation.

As shown in FIGURE 2, the means by which marker 23 is held in its elevated position comprises a ball-like stop member 49 affixed to the left-hand chain section 33 and engaging a latch member 50 pivoted upon a pin 51 mounted in housing 37. Latch member 50 forms part of overcenter alternating means generally indicated at 52 and also including a trip member 53 pivoted on a pin 54 mounted in housing 37 and also serving for the pivotal mounting of the inner ends of a pair of left- and right-hand actuator elements 55 and 56, respectively.

Figure 5:
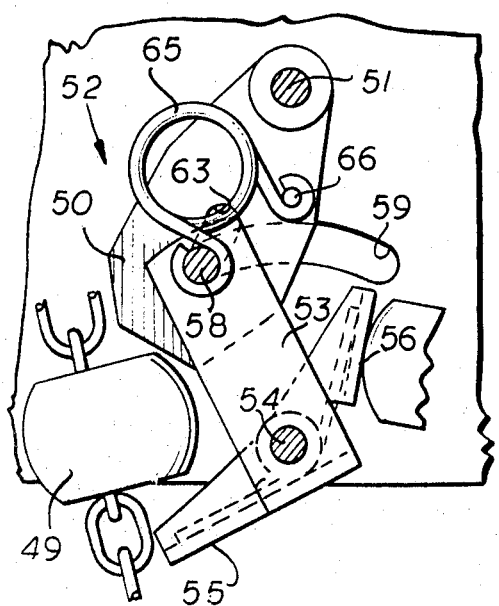
FIGURE 5 is a sectional plan view of the structure shown in FIGURE 3 with the top plate of housing 37 removed showing the automatically operating latch and the trip mechanism of this invention in the position of the parts with right-hand marker in lowered position as indicated in FIGURE 1.
Figure 6:
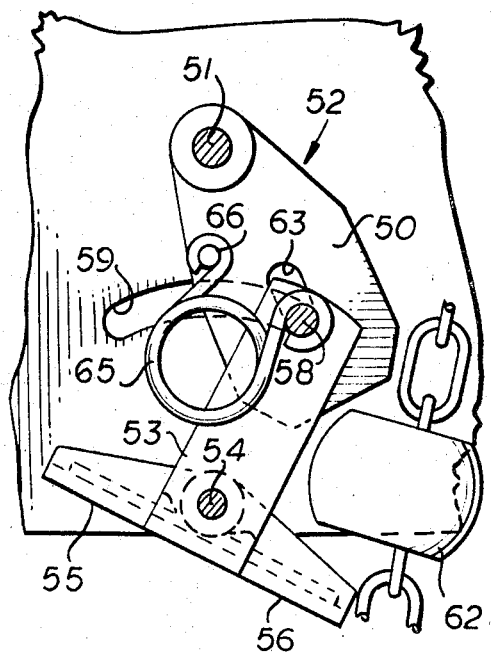
FIGURE 6 is a view similar to FIGURE 5 showing the position of the parts when the right-hand marker is lifted and the left-hand marker has been lowered.
Figure 7:
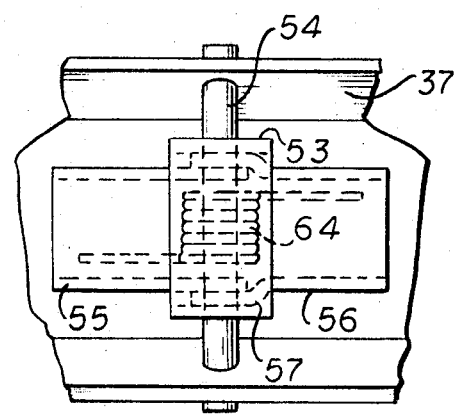
FIGURE 7 is an end view of FIGURE 5.
Figure 8:
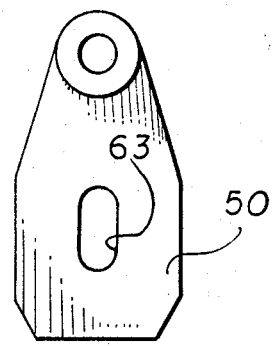
FIGURE 8 is a detail of the latch member.

Trip member 53 is U-shaped, having an end plate 57, and straddles latch member 50, being pivotally connected thereto medially of its ends by a pin 58 slidably receivable in arcuate slots 59 formed in the vertically spaced plate elements of housing 37. By swinging trip member 53 about the axis of pin 54 the free end of latch member 50 is shifted overcenter with respect to a line through pivot 51 and 54 from the position of FIGURE 5 to that of FIGURE 6.

Stop member 49 is prevented from passing around pulley 30 and allowing left-hand marker 23 to drop by the abutement of stop 49 against the free end of latch 50 and pulley 30.

For turning at the end of a field and reversing direction of operation, piston rod 20 is extended in cylinder 19 to rock the shaft 17 and move part 48 rearwardly, as to the dotted line position of FIGURE 4. Left-hand marker 23 moves to the dotted line position of FIGURE 1 where it engages a stop in the form of a chain guide 60 secured to bar 40, a similar chain guide 61 being provided at the other end of angle bar 40. Stop member 49 moves rearwardly past left-hand actuator member 55, and another ball-shaped stop member 62, affixed to right-hand chain section 34 moves inwardly with the lifting of right-hand marker 24, and passes over pulley 31 into engagement with right-hand actuator member 56. Pin 58 is slidable in a slot 63 in latch 50 and the rear faces of actuators 55 and 56 engage plate 57 as a stop so that continued rearward movement of stop 62 rocks trip member 53 from the position of FIGURE 5 to that of FIGURE 6. Pivoting of actuators 55 and 56 away from engagement with plate 57 occurs against the bias of a spring 64 surrounding pivot pin 54.

With retraction of piston rod 20 and cylinder 19 stop member 62 now engages latch 50 and pulley 31. Actuator 55 is pivotable in a clockwise direction as viewed in FIGURE 5 to accommodate passage of stop member 49 and lowering of left-hand marker 23 with the lowering of the implement frame, while right-hand actuator 56 is pivotable counterclockwise.

The members 52 and 53 are biased to their overcenter position by the provision of a torsion spring 65 anchored at one end to a pin 66 carried by housing 37, and at its other end to pin 58.

It is believed that the construction and operation of the novel marker-operating mechanism of this invention will be clearly understood from the foregoing description. It should likewise be understood that the invention has been described in a preferred embodiment only, and that modifications may be made therein without departing from the spirit of the invention.

What is claimed is:

1. Marker alternator mechanism for an implement having a frame with left- and right-hand markers mounted thereon, comprising cable means having left- and right-hand sections extending between and connected at its ends to said markers, a part mounted on the frame for reciprocating movement in a direction normal to the plane of said cable means and connected to the central portion of said cable means, movement of said part in one direction serving to move the central portion of said cable means to simultaneously raise said markers, a stop member secured to each of said cable means sections, said stop member engaging means including a latch member pivotally mounted on the frame and swingable about its pivot to engaging position with respect to said one of said stop members and releasing position with respect to the other of said stop members, and a spring biased trip member mounted on the frame having a pivotal connection to said latch member, said spring biased trip member being tripped by one of said stop members when the operating marker is raised to dispose said latch member in latching relation to said other stop member.

2. The invention set forth in claim 1, wherein said pivotal connection of said trip member to said latch member is movable overcenter to opposite sides of a line between the connections of said trip and latch members to the frame.

3. The invention set forth in claim 2, wherein a spring operatively connected between said trip and latch members biases the latch member to its stop engaging position.

4. The invention set forth in claim 3, wherein actuator means project from opposite sides of said trip member into the paths of said stop members, said stop members being alternately engageable in one direction with said actuator means to swing said trip and latch members overcenter against the bias of said spring means.

5. The invention set forth in claim 4 wherein said actuator means comprises a pair of abutment members mounted and projecting from opposite sides of said trip member and engageable by the respective of said stop members alternately moving in one diretion to swing said trip and latch members overcenter, said abutment members being pivotable upon engagement by said stop members moving in the other direction to accommodate passage of the stop members without tripping said latch means.

6. The invention set forth in claim 5, wherein said left- and right-hand cable sections are trained over a pair of spaced pulleys mounted on the frame and said part is connected to said central portion of said cable means between said pulleys.

7. The invention set forth in claim 6, wherein said latch member in its overcenter position is disposed adjacent one of said pulleys and cooperates therewith to engage one of said stop members to hold the associated marker in raised position.

References Cited

UNITED STATES PATENTS 2,604,027  7/1952  Hansen _____ 172—128
2,975,841  3/1961  Oehler et al. _____ 172—128

ANTONIO F. GUIDA, *Primary Examiner.*

JAMES W. PETERSON, *Assistant Examiner.*

U.S. Cl. X.R.

172—128